(No Model.) 2 Sheets—Sheet 1.

E. HUBBARD.
MACHINE FOR DRESSING HALF SPOOLS.

No. 518,954. Patented May 1, 1894.

Witnesses.
E. J. Wray.
Jean Elliott.

Inventor:
Eber Hubbard
by Burton and Burton
his attys.

THE NATIONAL LITHOGRAPHING COMPANY,
WASHINGTON, D. C.

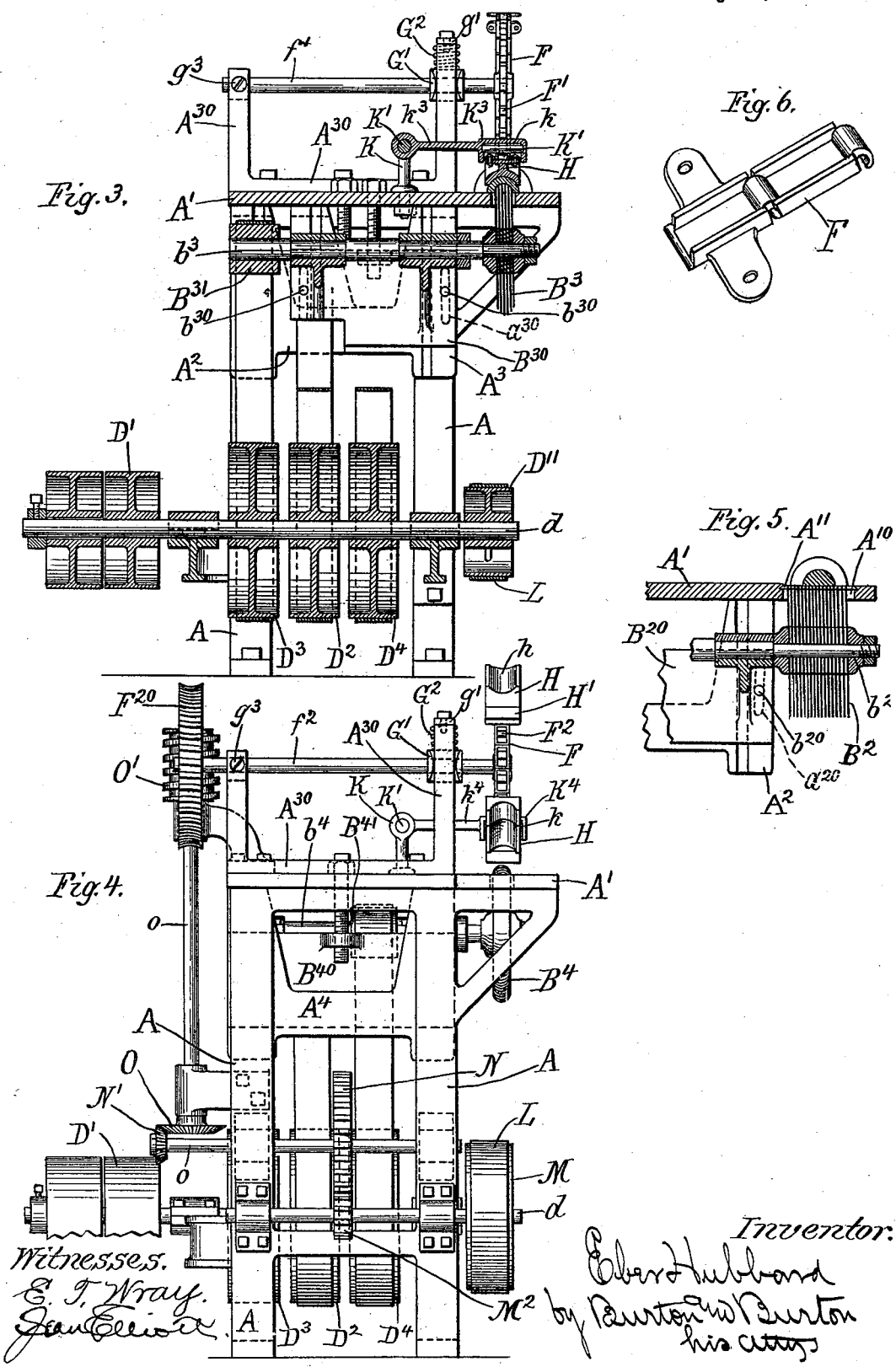

UNITED STATES PATENT OFFICE.

EBER HUBBARD, OF CHICAGO, ILLINOIS, ASSIGNOR TO THE WILLIMANTIC LINEN COMPANY, OF HARTFORD, CONNECTICUT.

MACHINE FOR DRESSING HALF-SPOOLS.

SPECIFICATION forming part of Letters Patent No. 518,954, dated May 1, 1894.

Application filed August 7, 1893. Serial No. 482,573. (No model.)

*To all whom it may concern:*

Be it known that I, EBER HUBBARD, a citizen of the United States, residing at Chicago, county of Cook, and State of Illinois, have invented certain new and useful Improvements in Machines for Dressing Half-Spools, which are fully set forth in the following specification, reference being had to the accompanying drawings, forming a part thereof.

This invention is a machine for use in the manufacture of spools of large size which are for certain reasons made in halves afterward united by gluing, its particular function being to dress the faces of the half spools which are to be thus secured together to make the complete spool, preparatory to so uniting them, and in its details it is particularly adapted to perform this process upon such half spools when the material of which they are composed is dried fibrous pulp, the half spools being molded preparatory to being thus united and finished.

Figure 1:
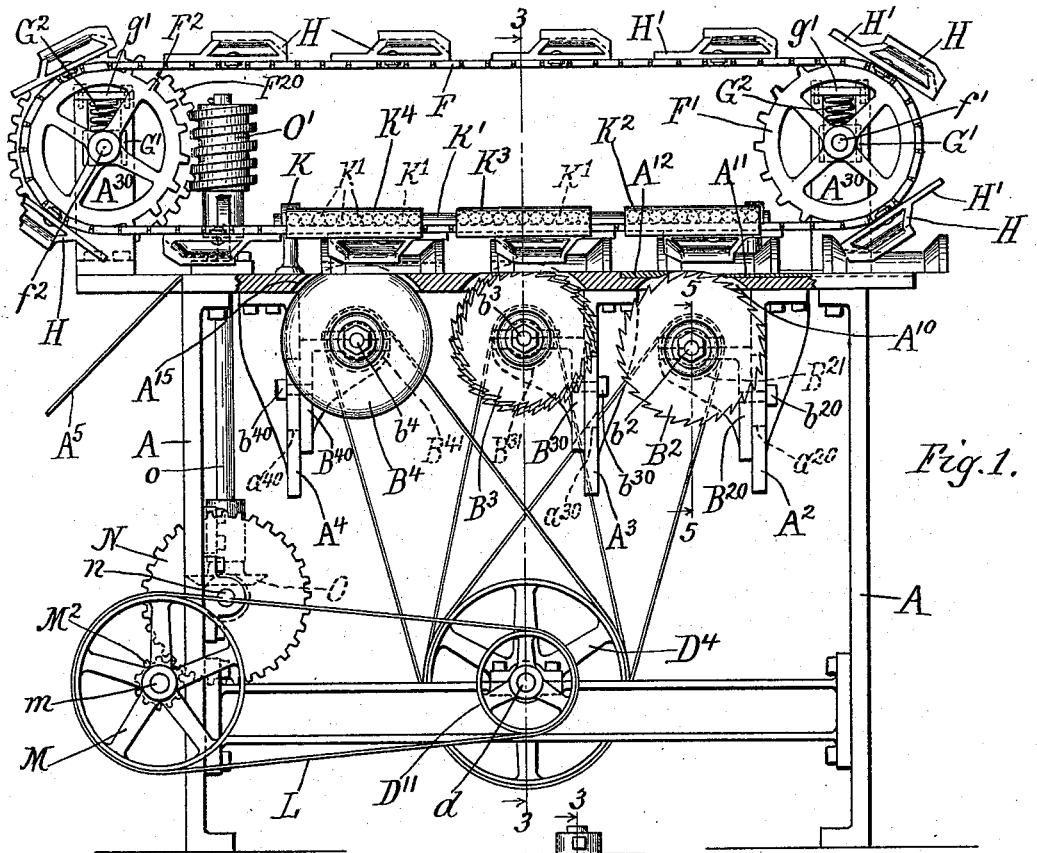
Figure 2:
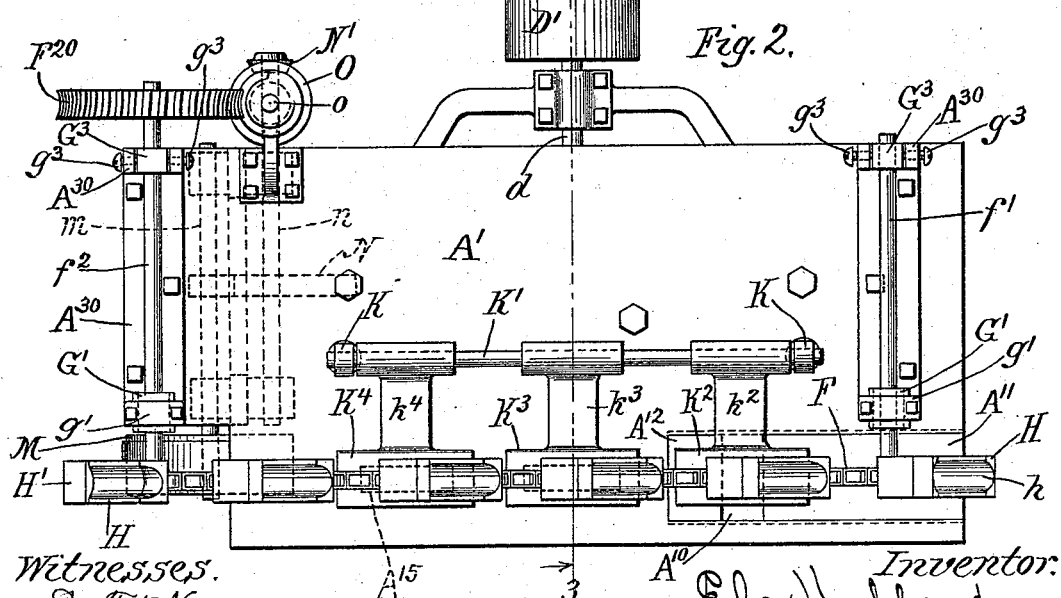

In the drawings—Figure 1 is a side elevation of my machine. Fig. 2 is a plan. Fig. 3 is a section at the line 3—3 on Figs. 1 and 2. Fig. 4 is an elevation of the delivery end. Fig. 5 is a detail section at the line 5—5 on Fig. 1. Fig. 6 is a perspective of two links of the feed chain.

The flat or diametrical surface, which is thus dressed by this machine when the half spool is made of fibrous pulp, is liable to be torn if treated by the means which will be naturally employed in dressing wood,—either planing or direct sawing. But this difficulty is avoided by dressing the surface by means of the wabbling saws,—that is to say, a plurality of saws arranged upon one shaft, all slightly oblique to that shaft, so that the path of the entire periphery of each saw is wider than its thickness to the extent of the obliquity of the saw, which is somewhat more than the interval between the saws on the shaft, so that the path of each saw fully meets and preferably slightly overlaps the path of each adjacent saw, whereby the material exposed in the path of the periphery of the entire gang is dressed away, and the object exposed to the action has the surface dressed to a shape outlined by an axial section through the gang of saws or near approximation to such outline; so that when all the saws of the gang are of the same diameter, a flat surface is produced. Inasmuch as the spool to be produced by the union of the two halves which are dressed in this machine is to have a central longitudinal aperture, each half has a longitudinal semi-cylindrical groove in the diametrical face, and this groove, as well as the flat surface, is dressed in my machine by a similar expedient,—the wabbling saws used for this purpose being as a group made to correspond to the shape of the grooves which they are to dress, the saws in the middle of the group being of a greater diameter than those of the sides, and diminishing from the center toward the sides, so that an axial section of the group would show a semi-circular edge at the periphery.

In the drawings, A is the frame of the machine; A', the top or bed. To the bed are secured depending brackets $A^2$ $A^3$ and $A^4$, to which are secured the bracket journal bearings $B^{20}$ $B^{30}$ and $B^{40}$ for three shafts $b^2$ $b^3$ and $b^4$, which carry respectively the gang of saws $B^2$ for dressing the flat face of the half spool, a gang of saws $B^3$ for dressing the semicircular groove in the face of the half spool, and an emery wheel $B^4$ for finishing the dressing of said semi-circular groove, which, as will hereinafter appear, is not perfectly reduced to the proper shape by the wabbling saws. The brackets $B^{20}$ $B^{30}$ and $B^{40}$ are adjustable on the brackets $A^2$ $A^3$ and $A^4$, the fastening bolts $b^{20}$ $b^{30}$ and $b^{40}$ passing through slots $a^{20}$ $a^{30}$ and $a^{40}$ in the brackets $A^2$ $A^3$ and $A^4$ to permit such adjustment. The bed A' is provided with an aperture $A^{10}$ in which the upper segment of the gang of saws $B^2$ protrude while the saws revolve. The upper surface of the bed A' at the receiving side of the aperture $A^{10}$ is lower than the remainder of the surface of the bed, to the extent of the amount that is to be dressed off from the face of the half spool, and the saws $B^2$ protrude through the aperture $A^{10}$ only to the general level of the upper surface of the bed and above the level of said reduced or lower receiving end of the bed to the extent that they are to dress away the spools. The upper surface of the bed is cut away at the margin of the aperture $A^{10}$ to receive the lips $A^{11}$ and $A^{12}$, which may be adjustable toward and from each other to vary the width of the aperture $A^{10}$ to the extent that it may be made the least possible consistently with permitting the saws to do their work. Each of said lips, it will be understood, is let into the bed, so that its upper surface is flush with the adjacent portion of the bed. The bed has also an aperture through which the upper segment of the gang of saws $B^3$ protrudes sufficiently to dress out the semi-circular groove in the face of the half spool, and the bed has a further similar aperture $A^{15}$ to permit the emery wheel $B^4$ in like manner to protrude into and finish the semi-circular groove. The gang of saws $B^2$, the gang $B^3$, and the emery wheel $B^4$, are driven by pulleys $D^2$ $D^3$ and $D^4$ on the shaft $d$, which is journaled on the lower part of the frame A, belts running from said pulleys to pulleys $B^{21}$ $B^{31}$ and $B^{41}$ on the shafts $b^2$ $b^3$ and $b^4$ of said saws and emery wheel respectively. The shaft $d$ derives power from any convenient source by means of the pulley $D'$ on said shaft outside the frame. The half spools are fed to and past these dressing mechanisms by a chain F, which runs about the sprocket wheels $F'$ and $F^2$, whose shafts $f'$ and $f^2$ are journaled upon standards $A^{30}$ $A^{30}$, one at each end of the bed. The journal boxes $G'$ $G'$ for said shafts, at the end nearest the sprocket wheels, are adapted to yield upward against springs $G^2$ $G^2$, stopped at their upper ends by the plate $g'$ which spans and covers the slot in which said journal boxes play and said springs are located. The journal boxes $G^3$ $G^3$ at the ends of said shafts remote from the sprocket wheels, are pivotally sustained in the upright at that end of the standards, the pointed screws $g^3$ $g^3$ set through the standards affording such pivotal connection. This construction permits the chain F to yield vertically slightly for a purpose which will be hereinafter made apparent. The chain F carries saddles or shoes H H, &c., which are attached to links of the chain at intervals. These shoes or saddles are of suitable shape to stride the shank of the half spool as the chain travels downward around the sprocket wheel $F'$ at the receiving end. For this purpose, the shoe consists of a block suitably attached to a link of the chain, the block having a semi-circular groove $h$, in its face remote from the chain which is the downward face in its operative position, this groove being made to correspond with the exterior of the shaft of the spool. The block has also a tail or rearward extension $H'$ long enough to extend out over the rear flange of the spool and rest upon the edge of that flange while the concave groove $h$ strides the shaft. The normal position of the sprocket wheel $F'$, and the action of the spring which presses upon its journal box is such that under the shoe which may be passing directly below the bearing of the sprocket wheel, there is scant room for a half spool between the shoe and the bed; therefore, when a shoe passing down around the sprocket wheel engages a half spool lying on the bed, the spring must yield slightly to permit the shoe, forcing the half spool with it, to pass the sprocket wheel. A firm grip and positive seating of the flat surface of the half spool upon the bed is thus insured, and the half spool is carried along with the chain toward the wabbling saws $B^2$, which dress away the requisite amount to render the surface true, the shoe or saddle holding the undressed surface firmly against the bed at the receiving side of the saws,—that is, on the lip $A^{11}$, while the forward end is projected over the saws and dressed away, and having been thus dressed, lodges upon the lip $A^{12}$, whose surface is as much higher than that of the lip $A^{11}$ than the dressed surface of the half spool is higher than the undressed surface. The tail of the rear extension of the shoe bearing upon the flange of the spool prevents the spool from tipping down where it projects above the saws, and so insures the accurate dressing of the face to the exact degree provided for in the difference of level of the two opposite margins of the aperture $A^{10}$. The continued movement of the chain carries the half spool thus dressed by the saws $B^2$ on above the saws $B^3$, which dress out the semi-circular groove but not with sufficient accuracy, such accuracy being unobtainable by means of the wabbling saws, although it may be closely approximated by the use of very thin saws very slightly separated and with very slight wabble or obliquity on their shafts. But having passed these saws, the half spool is then carried over the emery wheel, whose edge is shaped to perfect the groove. The half spool is supported in passing the saws $B^3$ and emery wheel $B^4$ upon the lateral portions of the flat face on which the dressing devices do not operate, and the bed is therefore of uniform level throughout this portion. The bed terminates or is cut away underneath the sprocket wheel $F^2$, and a steeply inclined delivery board or chute $A^5$ commences at that point, so that as the half spool is carried by the saddle under the sprocket wheel $F^2$, the saddle having no grip upon it, allows it to fall down the incline by which it is delivered to a proper receptacle. The only attention required, therefore, is that of placing half spools within reach of the shoes or saddles as they successively come down around the sprocket wheel $F'$. Since the chain might yield upward slightly between the two sprocket wheels under the pressure of the dressing devices, and thus permit the latter to lift the spools off of the face of the bed and so render them inaccurate, it is necessary to provide a resistance above the chain; but since the half spools themselves, as they come from the molds and after drying, will vary slightly in thickness, there must be a sufficient range of position permitted to the sprocket wheels and the chain so that while the largest or thickest half spool may be able to pass, the smallest or thinnest may be held closely down upon the bed and not allowed to jump or get away from the dressing devices to any extent, so far as the sprocket wheels are concerned. This is provided for in the yielding and pivotal bearings above described. And in order that the lower ply of the chain between the sprocket wheels may yield according to the size of the half spool which may be under it at any one point, and that such yielding at one point over either one of the dressing devices may not prevent it from yielding more or less at either one of the other dressing devices where there may be a thinner or thicker spool, I provide three independent weights $K^2 K^3$ and $K^4$, overhanging respectively the chain above the gangs of saws $B^2$ and $B^3$, and the emery wheel $B^4$, these weights being mounted at the ends of the lever arms $k^2 k^3$ and $k^4$, which are fulcrumed on a rod $K'$, which extends parallel with the path of the chain and at a distance therefrom, being mounted upon the posts K K upstanding from the bed. And in order that the chain may not have opportunity to sway or be deflected laterally, and so cause the groove in the face of the half spool to be misplaced or made irregular, I provide the weights upon their under face with channels $k$ $k$, which accurately guide the chain, being only wide enough to admit it without unduly binding it, and to ease the action I provide anti-friction rollers $K'$ $K'$ in such channels, against which the chain runs. The feeding mechanism above described is driven by a train which takes power from the shaft $d$, a pulley $D^{11}$ thereon driving a belt L, which passes over the pulley M, on the shaft $m$ which is journaled outside the end posts of the frame A, and has a pinion $M^2$, which meshes with the gear wheel N on the shaft $n$, journaled just inside the end posts of the frame A, said shaft having a beveled pinion $N'$ at the rear end outside the frame, which meshes with and drives the beveled gear O at the lower end of the vertical shaft $o$, which is journaled upon bearings which project rearward from the frame, and has, at its upper end, rigid with it, the worm $O'$, which meshes with and drives the worm wheel $F^{20}$ at the rear end of the shaft $f^2$. This train may be constructed to give any speed to the feeding chain which may be found most suitable according to the precise character of the material of the objects which are to be dressed, and the particular relation of speed between the dressing devices and the feed, which is indicated by the proportions of the several parts of this train as illustrated in the drawings, is not intended to be specially significant.

I claim—

1. In combination with the bed, a plurality of dressing devices which operate up through it arranged in succession, a feeding chain overhanging the bed and traveling in the direction in which said devices succeed each other, said chain being provided with spool-holding shoes separated by intervals as great as those which separate the successive dressing devices, whereby each spool is exposed to only one of the dressing devices at a time; weights overhanging the chain above the dressing devices, respectively, said weights being independent of each other and independently connected to the frame, whereby the spools are respectively and independently held down against the dressing devices: substantially as set forth.

2. In combination with the bed and the successive dressing devices operating up through it, a chain which overhangs the bed above the dressing devices and travels in the direction in which they succeed each other; the chain being provided with spool-holding shoes; weights which overhang the feed ply of the chain above the dressing devices respectively, said weights being independently connected to the frame and adapted, independently of each other, to press yieldingly upon the chain to hold the spools carried by the shoes respectively down onto the dressing devices, and the sprocket wheels by which the chain is driven provided with bearings adapted to yield elastically upward: substantially as set forth.

3. In combination with the bed and the successive dressing devices which operate up through it, the chain overhanging the bed and traveling up in the direction in which the dressing devices succeed each other and provided with spool-holding shoes; the weights overhanging the chain above the dressing devices respectively, said weights being independent of each other, and adapted independently to press the spools which pass under them successively down toward the dressing devices respectively, said weights being connected to the frame without opportunity for horizontal movement, and provided on their under faces with guide channels for the chain, whereby other lateral guards for the chain between the sprocket wheels are dispensed with: substantially as set forth.

4. In combination with the rigid bed and the dressing device operating upward through it, the upper surface of the bed at the receiving side of the dressing devices being reduced below the level of the opposite side, the feeding chain overhanging the bed, and the dressing device provided with shoes or saddles adapted to stride the shaft of the spool and provided with a rearwardly projecting tail to bear upon the rear flange of the spool, whereby the rear end of the spool is held down onto the bed at the receiving side until the forward end is lodged upon the bed at the farther side of the dressing device: substantially as set forth.

In testimony whereof I have hereunto set my hand, in the presence of two witnesses, at Chicago, Illinois, this 24th day of July, 1893.

EBER HUBBARD.

Witnesses:
 CHAS. S. BURTON,
 JEAN ELLIOTT.